United States Patent [19]

Bretl

[11] Patent Number: 4,907,248
[45] Date of Patent: Mar. 6, 1990

[54] ERROR CORRECTION FOR DIGITAL SIGNAL TRANSMISSION

[75] Inventor: Wayne E. Bretl, Schaumburg, Ill.

[73] Assignee: Zenith Electronics Corporation, Glenview, Ill.

[21] Appl. No.: 99,864

[22] Filed: Sep. 22, 1987

[51] Int. Cl.$^4$ .............................................. H04B 14/06
[52] U.S. Cl. ..................................... 375/27; 375/34; 358/135
[58] Field of Search ............... 375/27, 30, 31, 122, 375/34; 370/110.1; 332/11 D; 358/133, 135; 341/76; 371/67, 68

[56] References Cited

U.S. PATENT DOCUMENTS

| | | | |
|---|---|---|---|
| 3,891,959 | 6/1975 | Tsuji | 375/56 |
| 3,925,611 | 12/1975 | Dennis | 375/57 |
| 4,055,832 | 10/1977 | En | 340/146.1 |
| 4,413,289 | 11/1983 | Weaver et al. | 360/51 |
| 4,503,510 | 3/1985 | Weaver | 365/715 |
| 4,516,241 | 5/1985 | Farah et al. | 370/110.1 |
| 4,541,102 | 9/1985 | Grallert | 332/11 D |
| 4,583,237 | 4/1986 | Haskeu | 375/27 |
| 4,636,856 | 1/1987 | Starch | 358/135 |
| 4,665,436 | 5/1987 | Osborne et al. | 375/27 |
| 4,685,115 | 8/1987 | Akagiri et al. | 375/27 |
| 4,719,642 | 1/1988 | Lucas | 375/30 |
| 4,726,037 | 2/1988 | Jayant | 375/27 |

OTHER PUBLICATIONS

Digital Audio Technology by H. Nakajima et al., of Sony Corporation, No. 1451, pp. 172-178.

Primary Examiner—Robert L. Griffin
Assistant Examiner—Stephen Chin

[57] ABSTRACT

The system provides correction for error signals caused by noise in the transmission channel in digital signals or analog signals which have been digitized. The first or second differential of the quantized values is taken and encoded. One or more reliable update signals per data block are included in the transmitted signal. Using any difference between an update signal value and the corresponding actual received signal value, an error signal in time reverse sequence is reconstructed in the receiver. This signal is reversed and subtracted from a signal containing the error signal to produce an accurate output signal.

34 Claims, 3 Drawing Sheets

ERROR CORRECTION FOR DIGITAL SIGNAL TRANSMISSION

BACKGROUND OF THE INVENTION

This invention relates to the field of digital transmission and to a means for correcting errors in the reproduced signal caused by noise on the channel.

Many methods are known in the art for encoding analog signals before transmission in an attempt to make the reproduced signal an exact replica of the original signal. Some of these methods include sampling the analog signal and encoding the digitized signal in some manner. The encoding will frequently involve taking the differences between subsequent sample values, and even taking second differences in some cases. One example of this may be seen in U.S. Pat. No. 4,503,510 where the source signals are electro-cardiogram readings which are to be transmitted from the scene of an accident back to a hospital for interpretation by a doctor. Transmission of analog signals for this purpose having been found unsatisfactory, digitizing the signals had been tried. However, since the transmission path is often far from ideal, the noise in the channel often caused severe problems in interpreting the patient's symptoms. In this prior patent, the analog signals are digitized, then processed in a digital compression filter whose output is the difference between the actual value of a signal sample and an estimated value. These difference signals or delta's are then encoded using a Huffman code which takes advantage of the fact that the signals are differences and those differences have different probabilities of occurrence. Although this system operates with a greatly reduced data rate, it may be more strongly affected by noise in the channel than a simple PCM system would be. While errors in a small portion of some signals such as speech may not be too objectionable if the received signal is still intelligible, the recipient of an ECG, video or music signal may be disturbed by a single error in the received signal. The extent of the disruption will depend on the encoding/decoding scheme; in digitized audio signals it may range from a dull pop or thud to a loud noise to an unpleasant garbling of the music quality.

It is known, as shown in U.S. Pat. No. 4,055,832, to correct erroneous bits of received digital signals by sending an equal number of parity bits, but this system is inefficient of bandwidth or transmission rate.

As discussed in "Digital Audio Techniques" by Nakajima et al, 1985, Tab Books, Inc., there are many other ways to reduce or eliminate errors in digitally transmitted audio. These include using interpolation or substitution of a zero value (muting) or a previous good value or block of values for any value or block containing error. More elaborately, extrapolation—using information from both sides of the erroneous data—can be used to bridge over a deleted data word, such as creating a parabolic curve which matches the valid data at both ends. If the signal blocks are small enough these solutions will not always be objectionable, but it is far preferable to cancel the extraneous portion of the signal while retaining the correct signal. Incidentally, in this context, "error detection" typically means comparing an "update" value which is presumed to be correct with the decoded value. The update value may be arrived at in any suitable manner.

OBJECTS OF THE INVENTION

It is an object of the present invention to provide error correction in a digitally transmitted analog signal.

It is a particular object to correct one or a small number of errors in any one small block of the signal while maintaining the exact or nearly exact integrity of the original signal.

DETAILED DESCRIPTION OF THE INVENTION

Figure 1:
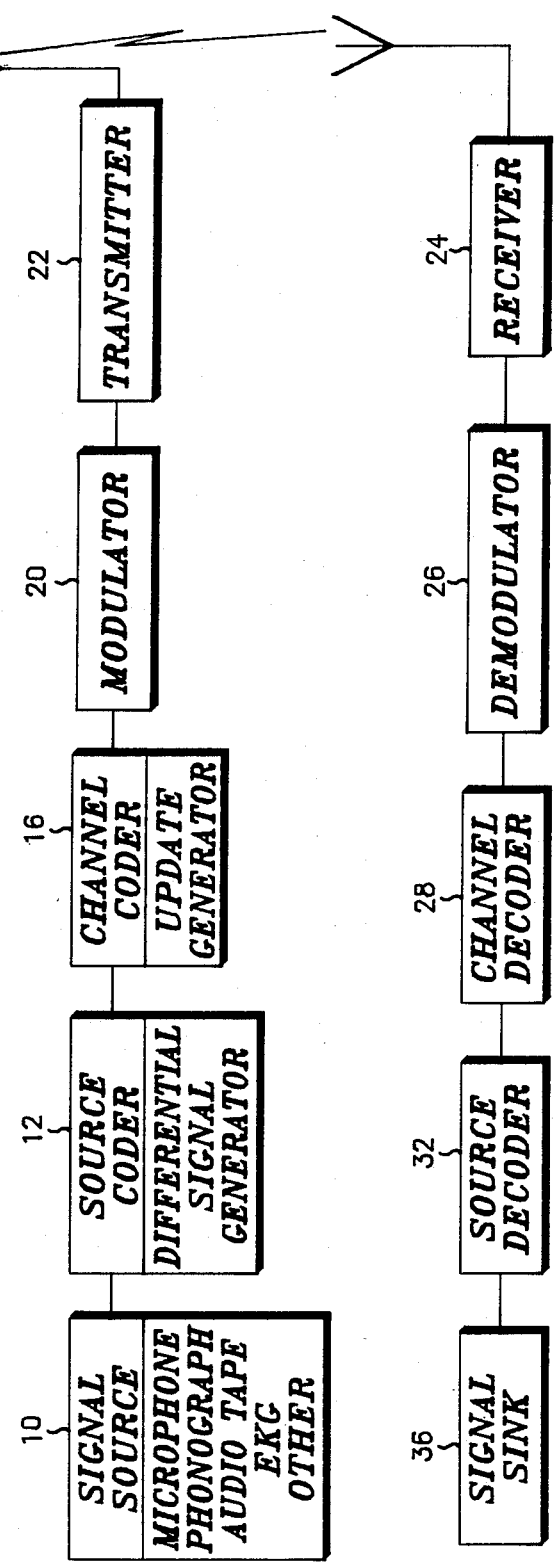
FIG. 1 is a simplified block diagram of a system including the invention.

Shown in the simplified block diagram of FIG. 1 is a system for the transmission and reception of digitized analog signals. It is to be noted that various other function blocks such as encrypters or frequency spreaders may be used in such systems, but only those blocks have been shown which are necessary for an understanding of the present invention.

A source 10 could be any source of analog signals such as a microphone, phonograph pickup, tape playback head or electrocardiograph. A source coder or formatter 12 transforms the analog signals into digital signals. This process usually involves sampling and quantizing the audio signals. In the present system it will preferably include data compression using a form of Huffman code with variable word length codes. A channel coder 16 may perform a number of functions but for this description only the structuring of the bit stream into blocks will be discussed.

The length of a block will depend on the allowed bit rate and other factors. In the present invention, a block will preferably have from 32 to 128 samples plus at least one update. In this context, an "update" will be understood to be a value which, because of the manner in which it is transmitted, is presumed to be an accurate value as received. The manner in which an update value is protected during transmission may be any reliable method and forms no part of the present invention.

At a 32 kHz sampling rate, a block could range from 1-4 msec. A modulator 20 will modulate the encoded signal onto a carrier by any suitable modulation method. A transmitting unit 22 will transmit the signal to a corresponding receiving unit 24. It is to be noted that "transmit" as used herein does not necessarily mean wireless transmission.

The signal is demodulated in a demodulator 26 and decoded in a channel decoder 28 and a source decoder 32 for use in whatever analog sink 36 is appropriate. In general, the processes of the two parts of the system are the inverse of each other as will be seen. Timing and control functions are required as is customary, but for the sake of brevity will not be shown or discussed.

Figure 2:
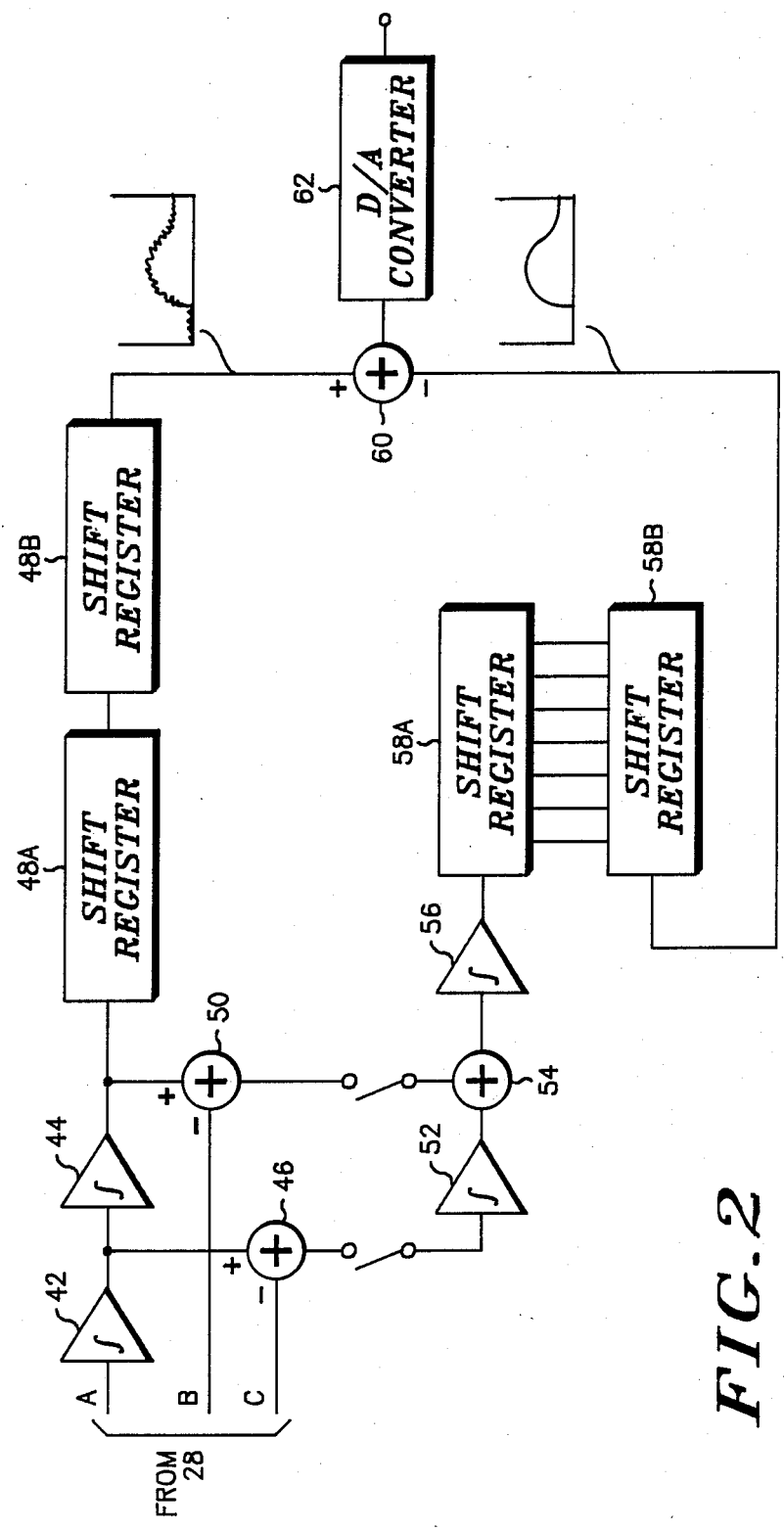
FIG. 2 is a diagram of a portion of the source decoder of the receiver of FIG. 1.

Before continuing on to the description of the source decoder 32 of FIG. 2, it will be well to summarize the operation of the source coder 12 of the transmitter. The coder 12 samples the input analog signal and quantizes the samples. The differences between each sample and the previous sample are found and a first differential data stream is formed from those difference values. Then, taking that data stream, the process is repeated to obtain a second differential data stream made up of the differences between the sequential values of the first data stream. Thus, in this preferred embodiment, the information to be transmitted is mainly the second differential of the sample values although a first differential could be used instead.

The coding process may utilize a truncated Huffman code such as that shown in U.S. Pat. No. 4,413,289. Such a code is readily implemented using conventional digital computing techniques. The code will comprise short code words for the most frequently encountered values of the second differential signal, with longer words for those values less often found. Those values which occur only rarely are sent uncoded, with a label designating them as such. Using such a code reduces the number of bits required to send the sample information.

If the transmission channel we-re error-free, the decoding process could be a relatively simple inverse of the encoding process. Since, however, noise is likely to be present in any received signal, causing errors in the decoding process, the source decoder 32 cannot be simply an inverse of the coder 12.

Figure 3:
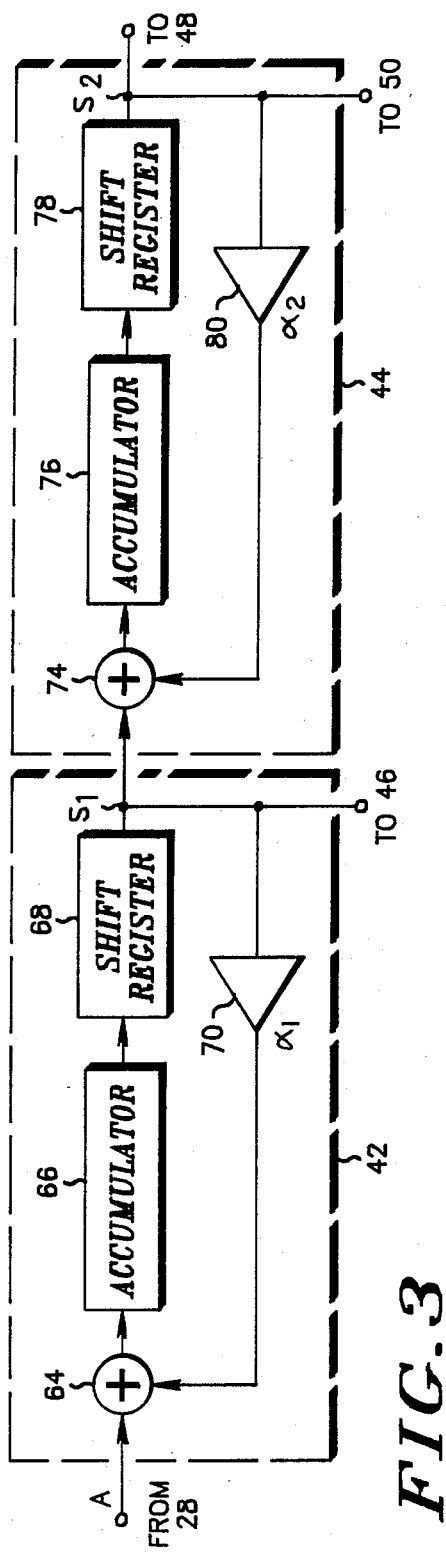
FIG. 3 is a diagram of one element of FIG. 2.

In FIG. 2, the source decoder 32 is shown with a first input A coupling the blocks of the bit stream from the channel decoder 28 to a first forward integrator 42 such as will be seen in FIG. 3. The output of the integrator 42 is coupled to a second forward integrator 44. The function of the forward integrators 42,44 is essentially the inverse of the differential function as described hereinabove; i.e., by adding (accumulating) the difference values in sequence, the original output signal of the source coder 12 can be determined. As is known, if the sampling rate is high enough, (Nyquist rate), accumulation of the difference values produces the same result as integration. The output of the integrator 42 is also coupled to the plus input of an adder 46. At the negative input the adder receives, via input terminal C from the channel decoder 28, the "update" or correct value for the last value at the integrator 42. Any difference between the actual value and the update value indicates, of course, an error. The second forward integrator 44 outputs to a pair of shift registers 48A,B and to the positive input of a second adder 50. At the negative input the adder 50 receives, via a third input B from the channel decoder 28, an update value which is the correct value for the last value at the integrator 44.

The output signal from the adder 50 is the difference between the two input values and thus represents any error in the last value. At the time the update values are received and subtracted from the last actual values, the outputs of the adders 46,50 are coupled to a "reverse integrator" 52 (see FIG. 4) and a third adder 54, respectively. The output of the reverse integrator 52 is coupled to a second input of the adder 54 and the adder output is coupled to a second reverse integrator 56. The reverse integrator 56 output is coupled to a shift register 58. Since the shift register 58 must perform the function of essentially reversing the calculated noise signal (which was calculated backwards from the correct final block value to the point where the noise occurred), it could be implemented as seen in FIG. 2 by two shift registers with parallel loading from register 58A to register 58B. The last value to enter register 58A then becomes the first value to exit register 58B and the calculated error signal has been reversed to normal sequence. The shift registers may be implemented in discrete form or as sections of random access memory RAM with appropriate addressing counters and control logic.

The output of the register 58B is coupled to the negative input of another adder 60. The positive input for the adder 60 is the output of the shift registers 48 which is the doubly integrated noise spike with the digitized version of the output of the analog source 10 superimposed as seen in FIG. 2. The output of the shift registers 58A,B is the doubly integrated noise spike alone (also illustrated in FIG. 2). Thus, the output signal of the adder 60 is the difference between the two input signals which is the correct digitized signal. This signal is then converted back to the original analog signal in a digital-to-analog (D/A) converter. The description above covers the case wherein a single noise spike occurs during one block of transmitted signal which is the most likely case. If a second noise spike should occur within the same block, the system would interpret the error as due to only one spike, and the reconstructed error signal would be slightly inaccurate. In the case of a massive amount of disturbance from noise, other means of minimizing the effects of noise would be needed and could be used in addition to the present scheme.

FIG. 3 is a more detailed diagram showing an embodiment of the forward integrators 42,44 of FIG. 2. Again, the input terminal A from the channel decoder 28 couples the difference (delta) signals to an adder 64 in the integrator 42. The output signals of the adder 64 are coupled to an accumulator 66. The accumulated output signal of the accumulator 66 is then coupled through a storage register 68 and fed back through a buffer amplifier 70 having a gain of $\alpha_1$ to a second input of adder 64. The integrator 44 is essentially a duplicate of the integrator 42 with an input coupled to receive the output signals from the storage register 68 of integrator 42. An adder 74 adds the input signal $S_1$ to a feedback signal and couples the total to an accumulator 76. The accumulated signal is then coupled to a storage register 78, the output of which is $S_2$, the analog signal with the error signal superimposed. $S_2$ is fed back to the adder 74 through a buffer amplifier 80 having a gain of $\alpha_2$. The value of $\alpha$ in each integrator will be $0 < \alpha \leq 1$, preferably nearly one, thus the integrators may be considered "leaky". This means that once a noise spike has been received, the resultant signals from the integrators will gradually decay as desired.

In operation, as each new delta value is entered at the terminal A, it is loaded into the accumulator 66 along with ($\alpha_1 S_1$) where $S_1$ is the output of the storage register 68. The summed output from the accumulator 66 is then loaded into the storage register 68, forming a new $S_1$ output signal. The new $S_1$ plus the current $\alpha_2 S_2$ is loaded into the accumulator 76 and added to the previous contents, forming a new $S_2$ which is then outputted through the storage register 78.

Figure 4:
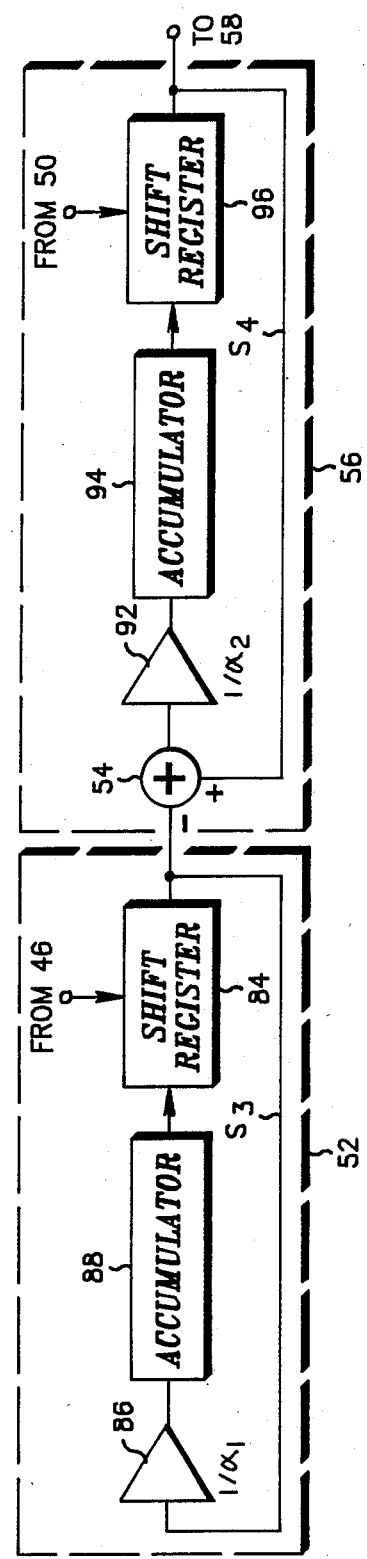
FIG. 4 is a diagram of another element of FIG. 2.

FIG. 4 shows a more detailed diagram of an embodiment of the "reverse" integrators 52,56. The term "reverse" is used to indicate that integrators 52,56 start with a last-received value and accumulate backwards to reconstruct the error signal waveform. The first error signal as outputted by the adder 46 is coupled into a storage register 84 (in 52) whose output signals are $S_3$. $S_3$ is coupled back to a buffer amplifier 86 whose gain is $1/\alpha_1$, thus the output signal of the amplifier is $S_3/\alpha_1$ which is coupled to an accumulator 88 where it is added to the previous $S_3$. The output signal from the accumulator 88 is coupled through the storage register 86 to become the new $S_3$. $S_3$ is also coupled to the negative input of an adder 90 where $S_3$ is subtracted from a feedback signal $S_4$. Note that the original value of $S_4$ was the second initial error signal which came from the adder 50. The adder output signal ($S_4$-$S_3$) is coupled to a buffer amplifier 92 in the integrator 56. Amplifier 92 has a gain of $1/\alpha_2$, making the amplifier output ($S_4$-$S_3$)/$\alpha_2$. This signal is coupled to another accumulator 94, and the accumulated signal is coupled to a storage register 96. It will be apparent that in the integrators 52,56, the positions of the buffer amplifiers and the accumulators could as well be reversed if desired. The output signal of the storage register 96 then becomes the new $S_4$ which is coupled to the storage registers 58A,B. The reversed output of the registers 58A,B is the reconstructed error signal coupled to the negative input of the adder 60. The error signal is thus subtracted from the signal $S_2$ to provide the digitized analog signal.

The integrators 52,56 will preferably have a feedback gain slightly greater than 1.0 and are unstable, providing an increasing output. As a more formal way of describing the function of the integrators, consider these equations:

(1) $S_1' = D + S_1(1-\beta)$
(2) $S_2' = S_1 + S_2(1-\beta)$ where $S_1$ is the present sample output of the first forward integrator 42; $S_1'$ is the next output; D represents the delta or difference value between $S_1$ and $S_1'$; the leakage $\beta = 1 - \alpha$ ($=2^{-8}$ in the preferred embodiment); $S_2$ and $S_2'$ are the current and next outputs of the second integrator 44. Note that $\alpha$ is very near 1, and $\beta$ is very small.

In the reverse integrators 52,56, the corresponding equations are:

(3) $S_4 = (S_4' - S_3')[1/(1-\beta)]$
(4) $S_3 = (S_3' - D')[1/(1-\beta)]$ where $S_3$ and $S_3'$ are the present and next values of the output of integrator 52; $S_4$ and $S_4'$ are the corresponding values of the output of the integrator 56; and $D'$ is the delta value prior to D. Since, in some embodiments, it may not be practical to use the quantity in brackets in equations (3) and (4), it is quite satisfactory to use the close approximation $(1+\beta)$ and avoid doing division in digital hardware. It is known that, if $\beta$ is very small, $(1+\beta) \approx 1/(1-\beta)$.

Thus there has been shown and disclosed a means for correcting errors in digitally processed and transmitted signals. The system is particularly applicable although not limited to analog signals such as music, video or ECG signals which are sampled and quantized, then the first or second differential of the samples is transmitted. The data is sent as relatively short blocks, each of which includes at least one update value. In the receiving unit, the blocks are processed in integrator circuits which restore the original signal waveform. Since the blocks may also contain error signals due to channel noise, any error signal is calculated backwards from the final error value. The error signal is reversed and then subtracted from the signal which includes the error signal to produce an error-free output.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true scope of the invention.

What is claimed is:

1. A system for the transmission and reception of a digital signal comprising:
    source means for providing said digital signal;
    processing means for providing a differential signal from said digital signal;
    channel coding means for dividing said differential signal into blocks and providing an error-immune update signal for the last value of each block;
    means for transmitting at least said differential signal and said update signal;
    means for receiving said transmitted signals;
    means for separating said received signals into at least two signals, said update signal and said differential signal, the differential signal including any channel noise component;
    first signal deriving means for utilizing said differential signal to provide a first derived signal which corresponds to said digital signal plus any error signal due to said channel noise component;
    second signal deriving means for utilizing both of said separated signals to provide a second derived signal which corresponds to said error signal; and
    means for combining said first and second derived signals to provide a first output signal which corresponds to said digital signal.

2. The transmission system according to claim 1 and further including encoding means for encoding said differential signal and said update signal prior to transmission, and decoding means for decoding said signals after transmission.

3. The transmission system according to claim 2 wherein said encoding means utilizes a variable word length code based on the probabilities of occurrence of the differentials of said differential signals.

4. The transmission system according to claim 1 wherein said transmitting means includes modulating means for modulating at least said differential signals and said update signals onto a carrier frequency signal, and said receiving means includes demodulating means.

5. The transmission system according to claim 1 wherein said first and second deriving means comprise integrating means.

6. The transmission system according to claim 1 wherein said differential signal is a second differential signal.

7. A system for the transmission and reception of a digital signal comprising:
    source means for providing said digital signal;
    processing means for providing a differential signal from said digital signal;
    channel coding means for dividing said differential signal into blocks and providing an error-immune update signal for the last value of said digital signal of said block;
    means for transmitting at least said differential signal and said update signal;
    means for receiving said transmitted signals;
    means for separating said receiving signals into at least two signals, said update signal and said differential signal, the differential signal including any channel noise component;
    first signal deriving means for utilizing said differential signal to provide a first derived signal which corresponds to said digital signal plus any error signal due to said channel noise component, wherein said first deriving means comprises first and second integrating means, said integrating means being sequentially connected;

second signal deriving means for utilizing both of said separated signals to provide a second derived signal which corresponds to said error signal; and means for combining said first and second derived signals to provide a first output signal which corresponds to said digital signal.

8. A system for the transmission and reception of a digital signal comprising:

source means for providing said digital signal;

processing means for providing a differential signal from said digital signal;

channel coding means for dividing said differential signal into blocks and providing an error-immune update signal for the last value of the digital signal of each block;

means for transmitting at least said differential signal and said update signal;

means for receiving said transmitted signals;

means for separating said received signals into at least two signals, said update signal and said differential signal, the differential signal including any channel noise component;

first signal deriving means for utilizing said differential signal to provide a first derived signal which corresponds to said digital signal plus any error signal due to said channel noise component.

second signal deriving means for utilizing both of said separated signals to provide a second derived signal which corresponds to said error signal wherein said second deriving means comprises first and second integrating means, said integrating means being sequentially connected; and means for combining said first and second derived signals to provide a first output signal which corresponds to said digital signal.

9. A system for the transmission and reception of a digital signal comprising:

source means for providing said digital signal;

processing means for providing a differential signal from said digital signal;

channel coding means for dividing said differential signal into blocks and providing an error-immune update signal for the last value of each block;

means for transmitting at least said differential signal and said update signal;

means for receiving said transmitted signals;

means for separating said received signals into at least two signals, said update signal and said differential signal, the differential signal including any channel noise component;

first deriving means including first and second integrators and utilizing said differential signal to provide a first derived signal which corresponds to said digital signal plus any error signal due to said channel noise component;

second deriving means including third and fourth integrators and utilizing both of said separated signals to provide a second derived signal which corresponds to said error signal; and means for combining said first and second derived signals to provide a first output signal which corresponds to said digital signal.

10. A system for the transmission and reception of a digital signal comprising:

source means for providing said digital signal;

processing means for providing a differential signal from said digital signal;

channel coding means for dividing said differential signal into blocks and providing an update signal for the last value of each block, said update signal being essentially immune to error caused by noise in the transmission channel;

means for transmitting at least said differential signal and said update signal;

means for receiving said transmitted signals;

means for separating said received signals into at least two signals, said update signal and said differential signal, the differential signal including any channel noise component;

first deriving means for providing a first derived signal which corresponds to said digital signal plus any error signal due to said channel noise component and including;

first combining means for combining said differential signal and a feedback signal, accumulator means for accumulating the output signals of said combining means during each said block, and storage means for storing the accumulator means output signals, said storage means being coupled to supply said feedback signal;

second deriving means for utilizing both of said separated signals to provide a second derived signal which corresponds to said error signal; and second combining means for combining said first and second derived signals to provide a first output signal which corresponds to said digital signal.

11. The transmission system according to claim 10 and further including buffer means coupled between said storage means and said first combining means and having a gain equal to or less than unity.

12. The transmission system according to claim 10 and wherein said first deriving means further includes third combining means for combining the output signals of said storage means with a second feedback signal, second accumulator means for accumulating the output signals of said third combining means during each said block, and second storage means for storing the output signals of said second accumulator means, said second storage means being coupled to supply said second feedback signal.

13. The transmission system according to claim 12 and further including buffer means coupled between said second storage means and said third combining means and having a gain of approximately but less than unity.

14. The transmission system according to claim 12 and wherein said second deriving means includes;

fourth combining means coupled to said first deriving means and said separating means for providing a first final block value of said error signal, third accumulator means coupled for accumulating said final block value and a third feedback signal during each said block, third storage means coupled to said third accumulator means output, said third storage means being coupled to supply said third feedback signal, fifth combining means coupled to said third storage means and said separating means for providing a second final block value of said error signal, fourth accumulator means coupled for accumulating a fourth feedback signal during each said block, and fourth storage means for storing the fourth accumulator means output signals and said second final block value, said fourth storage means being coupled to supply said fourth feedback signal.

15. The transmission system according to claim 14 wherein said second deriving means further includes buffer means coupled in the paths of at least one of said third and fourth feedback signals and having respective gains of approximately but not less than unity.

16. A system for the transmission and reception of a digital signal comprising:
source means for providing said digital signal;
processing means for providing a differential signal from said digital signal;
channel coding means for dividing said differential signal into blocks and providing at least one update signal for the last value of each block, said update signal being essentially immune to error caused by noise in the transmission channel;
means for transmitting at least said differential signal and said update signal;
means for receiving said transmitted signals;
means for separating said received signals into at least two signals, said update signal and said differential signal, the differential signal including any channel noise component;
first deriving means for providing a first derived signal which corresponds to said digital signal plus any error signal due to said channel noise component and including;
first combining means for combining said differential signal and a first feedback signal,
first accumulator means for accumulating the output signals of said first combining means during each said block, and
first storage means for storing the first accumulator means output signals, said storage means being coupled to supply said first feedback signal;
second deriving means for providing a second derived signal which corresponds to said error signal and including;
second combining means coupled to said first deriving means and said separating means for providing a final block value of said error signal,
second accumulator means coupled for accumulating said final block value and a second feedback signal during each said block, and
second storage means coupled to said second accumulator means output, said second storage means being coupled to supply said second feedback signal; and
third combining means for combining said first and second derived signals to provide a first output signal which corresponds to said digital signal.

17. The transmission system according to claim 16 wherein said first and second deriving means further include buffer means coupled in the path of each of said first and second feedback signal respectively and having a gain of approximately but not less than unity.

18. The transmission system according to claim 16 and wherein said second deriving means further includes third storage means coupled to said second storage means output for storing at least two blocks of said second feedback signal and for reversing the sequence of values of each said block.

19. A system for the transmission and reception of a digitally processed analog signal comprising:
source means for providing said analog signal;
processing means for digitizing said analog signal and providing a differential signal therefrom;
channel coding means for dividing said differential signal into blocks and providing an update signal for the last value of each block, said update signal being essentially error-immune;
means for transmitting at least said differential signal and said update signal;
means for receiving said transmutted signals;
means for separating said received signals into at least two signals, said update signal and said differential signal, the differential signal including any channel noise component;
first deriving means for utilizing said differential signals to provide a first derived signal which corresponds to said digitized analog signals plus any error signal due to channel noise;
second deriving means for utilizing both of said divided signals to provide a second derived signal which corresponds to said error signal;
means for combining said first and second derived signals to provide an output signal which corresponds to the digitized analog signal; and
means for converting said output signal to provide said analog signal.

20. The transmission system according to claim 19 wherein said analog signal is a audio signal.

21. The transmission system according to claim 19 wherein said analog signal is an electrocardiograph signal.

22. The transmission system according to claim 19 wherein said analog signal is a video signal.

23. A system for the transmission and reception of a digitally processed analog signal comprising:
source means for providing said analog signal;
processing means for digitizing said analog signal and providing a differential signal therefrom;
channel coding means for dividing said differential signal into blocks and providing an update signal for the last value of the digital signal of each block, said update signal being essentially error-immune;
means for transmitting at least said differential signal and said update signal;
means for receiving said transmitted signals;
means for separating said received signals into at least two signals, said update signal and said differential signal, the differential signal including any channel noise component;
first deriving means for utilizing said differential signals to provide a first derived signal which corresponds to said digitized analog signals plus any error signal due to channel noise;
second deriving means for utilizing both of said divided signals to provide a second derived signal which corresponds to said error signal and wherein said second deriving means includes backward integrating means for providing a reversed error signal and means for reversing said reversed signal;
means for combining said first and second derived signals to provide an output signal which corresponds to the digitized analog signal; and
means for converting said output signal to provide said analog signal.

24. A receiving unit for retrieving an analog signal which has been digitized, differentiated, encoded and transmitted, and which periodically includes at least one update value; the unit comprising:
input means for receiving the transmitted signal;
demodulating means for demodulating the received signal;

decoding means for decoding the demodulated signal;

first integrating means coupled to the decoding means for providing a first signal which corresponds to the digitized analog signal and includes any error signal;

second integrating means coupled to the decoding means for providing a second signal which corresponds to said error signal;

means for combining said first and second signals to provide a first output signal which is free of any error signal; and means for converting said first output signal to provide said original analog signal.

25. A receiving unit for retrieving an analog signal which has been digitized, differentiated, encoded and transmitted, and which periodically includes at least one update value; the unit comprising:

input means for receiving the transmitted signal;

demodulating means for demodulating the received signal;

decoding means for decoding the demodulated signal;

first integrating means including a first integrator and coupled to the decoding means for providing a first signal which corresponds to the digitized analog signal and includes any error signal;

second integrating means coupled to the decoding means and including, means for determining any difference between said update value and a predetermined signal value from said first integrating means, a second integrator coupled for integrating said difference to provide a reversed error signal, and means for reversing the sequence of values of said error signal for providing a second signal which corresponds to said error signal;

means for combining said first and second signals to provide a first output signal which is free of any error signal; and means for converting said first output signal to provide said original analog signal.

26. A receiving unit according to claim 25 and wherein said digitized analog signal is twice differentiated, said transmitted signal includes a second update value, said first integrating means includes a third integrator, and said second integrating means includes a fourth integrator and second means for determining any difference between said second update value and a second predetermined value from said first integrating means.

27. A receiving unit for retrieving a digital information signal which has been differentiated, encoded and transmitted; the unit comprising:

input means for receiving the transmitted signal;

demodulating means for demodulating the received signal;

decoding means for decoding the demodulated signal;

first integrating means coupled to the decoding means for providing a first signal which corresponds to the differentiated signal and includes any error signal;

second integrating means coupled to the decoding means for providing a second signal which corresponds to said error signal; and means for combining said first and second signals to provide an output signal which is free of any error signal.

28. An error correcting circuit for use with a differential digital signal which includes an accurate update signal for each transmitted block of said digital signal, the circuit comprising:

means for receiving the transmitted signal;

means for separating said update signal from the remaining received signal;

first integrating means for integrating said remaining signal and providing a first output signal which may include an error signal;

detecting means using said update signal to detect any error in the last value in the corresponding block of said remaining signal and providing an error value;

second integrating means for integrating back from said error value and reconstructing said error signal for each said block; and means coupled to said first and second integrating means for providing the corrected digital signal.

29. The error correcting circuit according to claim 28 wherein said differential signal was derived from a digitized analog signal.

30. A method for removing from a block of data any error signal due to channel noise, the method comprising the steps of:

developing a first signal representing the block of data and including said error signal;

developing an error signal value representing the final value of the block of said error signal;

developing a second signal in time reverse sequence in response to said error signal value;

developing a third signal representing said error signal in response to said second signal; and subtracting said third signal from said first signal to remove said error signal therefrom.

31. A method for correcting an error in a differential digital signal which includes at least one accurate update value for each transmitted block of said signal, and comprising the steps of:

separating said update value from the remaining signal;

integrating each block of said remaining signal and providing a first output signal which may include an error signal;

detecting any difference between said update value and a predetermined value of said first output signal;

providing an error value in response to said difference;

integrating back from said error value and reversing the integrated signal to reconstruct said error signal; and subtracting said error signal from said first output signal to provide a final output signal.

32. A method for correcting an error in a differential digital signal which includes at least two accurate update values for each transmitted block of said signal, and comprising the steps of:

receiving said transmitted signal;

separating said update values from the remaining received signal;

integrating each block of said remaining signal and providing a first output signal which may include a first error signal;

detecting any difference between a first one of said update values and a predetermined value of said first output signal and providing a first error value in response to said detected difference;

integrating back from said first error value to reconstruct said first error signal;

integrating said first output signal to provide a second output signal which may include a second error signal;

detecting any difference between a second one of said update values and a predetermined value of said second output signal and providing a second error value in response to said detected difference;

integrating back from said second error value and reversing the integrated signal to reconstruct said second error signal; and subtracting said second error signal from said second output signal to provide an essentially error-free final output signal.

33. A method for the transmission and reception of a digital signal comprising the steps of:

providing a differential signal from said digital signal;

dividing said differential signal into blocks; providing an update signal for the last value of each said block, said update signal being essentially immune to error caused by noise in the transmission channel;

transmitting at least said differential signal and said update signal;

receiving said transmitted signals;

separating said received signals into at least two signals, said update signal and said differential signal, the differential signal including any channel noise component;

utilizing said differential signal to provide a first derived signal which corresponds to said digital signal plus any error signal due to said channel noise component;

utilizing both of said divided signals second derived signal which corresponds to said error signal; and combining said first and second derived signals to provide a first output signal which corresponds to said digital signal.

34. A method for retrieving an analog signal which has been digitized, differentiated, encoded and transmitted, and which periodically includes at least one update value, the method including the steps of:

receiving and demodulating the transmitted signal;

decoding the demodulated signal;

providing a first signal which corresponds to the digitized analog signal and includes any error signal;

determining any difference between said update value and a predetermined signal value from said first signal;

integrating backward from said difference value to provide a reversed error signal;

reversing the sequence of values of said error signal for providing a second signal which corresponds to said error signal;

combining said first and second signals to provide a first output signal which is free of any error signal; and converting said first output signal to provide said original analog signal.

* * * * *